United States Patent
Ren et al.

(10) Patent No.: US 11,728,699 B2
(45) Date of Patent: Aug. 15, 2023

(54) STATOR ASSEMBLY AND ELECTRIC MOTOR

(71) Applicants: FOSHAN WELLING WASHER MOTOR MANUFACTURING CO., LTD., Guangdong (CN); HUAI'AN WELLING MOTOR MANUFACTURING CO., LTD., Jiangsu (CN)

(72) Inventors: Jing Ren, Guangdong (CN); Jianwu Tang, Guangdong (CN); Xiaogang Zhu, Guangdong (CN); Xi Luo, Guangdong (CN)

(73) Assignees: FOSHAN WELLING WASHER MOTOR MANUFACTURING CO., LTD., Guangdong (CN); HUAI'AN WELLING MOTOR MANUFACTURING CO., LTD., Jiangsu (CN)

(*) Notice: Subject to any disclaimer, the term of this patent is extended or adjusted under 35 U.S.C. 154(b) by 79 days.

(21) Appl. No.: 17/489,013

(22) Filed: Sep. 29, 2021

(65) Prior Publication Data

US 2022/0021252 A1    Jan. 20, 2022

Related U.S. Application Data

(63) Continuation of application No. PCT/CN2019/125827, filed on Dec. 17, 2019.

(30) Foreign Application Priority Data

Apr. 18, 2019    (CN) .......................... 201910311989.0

(51) Int. Cl.
*H02K 1/18* (2006.01)
*H02K 11/40* (2016.01)
*H02K 5/04* (2006.01)

(52) U.S. Cl.
CPC ...................................... *H02K 1/18* (2013.01)

(58) Field of Classification Search
CPC ............. H02K 1/18; H02K 11/40; H02K 5/04
(Continued)

(56) References Cited

U.S. PATENT DOCUMENTS

2015/0229172 A1    8/2015   Kashihara et al.

FOREIGN PATENT DOCUMENTS

| CN | 102025213 A | 4/2011 |
| CN | 201830040 U | 5/2011 |

(Continued)

OTHER PUBLICATIONS

International Search Report dated Mar. 27, 2020 received in International Application No. PCT/CN2019/125827 together with an English language translation.

(Continued)

*Primary Examiner* — Jose A Gonzalez Quinones
(74) *Attorney, Agent, or Firm* — Scully, Scott, Murphy & Presser, P.C.

(57) ABSTRACT

A stator assembly and an electric motor are provided. The stator assembly has an upper end cover, a stator core, an insulation frame, a fixing piece and a communicating piece. The stator core is located below the upper end cover. The insulation frame is arranged on the stator core. The fixing piece is arranged at a top of the insulation frame. One end of the communicating piece is sandwiched between the fixing piece and the upper end cover, and another end extends in a thickness direction of the upper end cover and is connected to the stator core. The fixing piece fixes the insulation frame, the communicating piece and the upper end cover.

18 Claims, 7 Drawing Sheets

(58) Field of Classification Search
USPC .................................. 310/216.004, 216.005
See application file for complete search history.

(56) References Cited

FOREIGN PATENT DOCUMENTS

| CN | 202424392 | U |   | 9/2012 |
| CN | 202488283 | U |   | 10/2012 |
| CN | 202931046 | U | * | 5/2013 |
| CN | 202931046 | U |   | 5/2013 |
| CN | 202931046 | U |   | 8/2013 |
| CN | 104467294 | A |   | 3/2015 |
| CN | 104467295 | A | * | 3/2015 |
| CN | 104467295 | A |   | 3/2015 |
| CN | 204361823 | U |   | 5/2015 |
| CN | 104836384 | A |   | 8/2015 |
| CN | 104836384 | A |   | 12/2015 |
| CN | 206878648 | U |   | 1/2018 |
| CN | 109038911 | A |   | 12/2018 |
| CN | 109038959 | A |   | 12/2018 |
| EP | 3021461 | B1 |   | 5/2017 |
| JP | 2004254398 | A |   | 9/2004 |
| JP | 2008283816 | A |   | 11/2008 |
| KR | 101442414 | B1 |   | 9/2014 |
| WO | 2011043075 | A1 |   | 4/2011 |

OTHER PUBLICATIONS

Decision of Rejection dated Sep. 5, 2022 received in Chinese Patent Application No. CN 201910311989.0.
Notification of the First Action dated Aug. 12, 2022 received in Chinese PAtent Application No. CN 201910311989.0.
Notice of Reasons for Refusal dated Aug. 30, 2022 received in Japanese Patent Application No. JP 2021-553810.

* cited by examiner

STATOR ASSEMBLY AND ELECTRIC MOTOR

CROSS-REFERENCE TO RELATED APPLICATIONS

The present application is a continuation application of PCT International Application No. PCT/CN2019/125827, filed on Dec. 17, 2019, which claims the priority of Chinese Patent application No. 201910311989.0, filed in the CNIPA on Apr. 18, 2019 and entitled "STATOR ASSEMBLY AND ELECTRIC MOTOR", the entire contents of which are herein incorporated by reference for all purposes. No new matter has been introduced.

FIELD

The present disclosure relates to the field of stator technology, and particularly relates to a stator assembly and an electric motor having the stator assembly.

BACKGROUND

Electric motors have been widely used in various fields of life. An electric motor comprises a stator assembly, and an end cover is provided at either end of the stator assembly. Currently, the stator core in the stator assembly is generally tightly mated with the end covers in order to prevent electric corrosion. However, in this way, the electric corrosion prevention effect of the electric motor is not prominent, and noise can be readily produced during the operation of the electric motor, which will reduce the performance of the electric motor.

SUMMARY

The present disclosure solves at least one of the technical problems existing in the prior art or the related art.

To this end, a first aspect of the present disclosure is to provide a stator assembly.

A second aspect of the present disclosure is to provide an electric motor.

According to the first aspect of the present disclosure, a stator assembly is provided. The stator assembly includes an upper end cover, a stator core, an insulation frame, a fixing piece, and a communicating piece. The stator core is located below the upper end cover. The insulation frame is arranged on the stator core. The fixing piece is arranged at a top of the insulation frame. One end of the communicating piece is sandwiched between the fixing piece and the upper end cover, and another end of the communicating piece extends in a thickness direction of the upper end cover and is connected to the stator core.

The stator core is used for arranging a stator winding, and the upper end cover is a cast aluminum end cover. The insulation frame is arranged on the stator core, thereby preventing short circuit from occurring between the stator winding and the stator core and also preventing the impact of the short circuit on the normal operation of the electric motor. The fixing piece is arranged at a top of the insulation frame, and the fixing piece may be a plastic fixing piece, i.e., the fixing piece may play an insulating role. One end of the communicating piece is sandwiched between the fixing piece and the upper end cover, and another end of the communicating piece extends in a thickness direction of the upper end cover and is connected to the stator core. That is, electric conduction is realized between the upper end cover and the stator core through the communicating piece, which avoids potential difference between the upper end cover and the stator core. According to the present disclosure, by using the fixing piece to fix the insulation frame, the communicating piece and the upper end cover, the internal structural composition of the stator assembly is effectively optimized while still ensuring prevention of electric corrosion. As a result, the application scope of an electric corrosion prevention structure of the electric motor is expanded, the production cost of the electric motor is reduced, the assembly process is reduced, and the production efficiency is improved. In the present disclosure, the electric corrosion prevention structure of the electric motor is a communicating sheet electrically connected with the upper end cover and the stator core.

In addition, the stator assembly according to certain embodiments of the present disclosure may also have the following additional features.

In an embodiment, the fixing piece comprises a fixing body and a clamping groove, the clamping groove is arranged at a bottom of the fixing body, and at least part of the insulation frame is embedded in the clamping groove.

In this embodiment, the fixing piece comprises a fixing body and a clamping groove. The clamping groove is arranged at a bottom of the fixing body, and at least part of the insulation frame is embedded in the clamping groove. The insulation frame comprises a pin receiving portion which is embedded in the clamping groove.

In an embodiment, the fixing piece further comprises limiting ribs arranged on a side of the fixing body facing an interior of the stator core.

In this embodiment, the fixing piece further comprises limiting ribs arranged on a side of the fixing body facing an interior of the stator core. During the process of injection molding of the fixing piece, the insulation frame, the stator core and the upper end cover, due to the effect of the injection molding pressure, the fixing piece will receive a force towards the interior of the stator core, and by arranging limiting ribs, the limiting ribs are able to abut against the injection mold during the injection molding process, thereby preventing the fixing piece from falling towards the interior of the stator core, and ensuring the position accuracy of the fixing piece. Further, the number of limiting ribs is at least two.

In an embodiment, the fixing piece further comprises a sink groove which is arranged on the fixing body and in which at least part of the communicating piece is embedded.

In this embodiment, the fixing piece further comprises a sink groove, the sink groove is arranged on the fixing body, and at least part of the communicating piece is embedded in the sink groove, thereby ensuring that the communicating piece is not easily displaced in both the radial direction and the axial direction, and ensuring the position stability of the communicating piece on the fixing piece.

In an embodiment, the fixing piece further comprises a mounting hole arranged at a top of the fixing body and located in the sink groove; and the stator assembly further comprises an assembly hole and an electric corrosion preventing hole. The assembly hole is arranged at a top of the communicating piece, corresponding to the mounting hole; the electric corrosion preventing hole is provided on the upper end cover, corresponding to the assembly hole; and a fastener is passed through the electric corrosion preventing hole, the assembly hole and the mounting hole to connect the upper end cover, the communicating piece and the fixing piece.

In this embodiment, the fixing piece further comprises a mounting hole arranged at a top of the fixing body and located in the sink groove. The mounting hole may be a blind hole. The stator assembly further comprises an assembly hole and an electric corrosion preventing hole. The assembly hole is arranged at a top of the communicating piece, corresponding to the mounting hole; the electric corrosion preventing hole is provided on the upper end cover, corresponding to the assembly hole; and a fastener is passed through the electric corrosion preventing hole, the assembly hole and the mounting hole to connect the upper end cover, the communicating piece and the fixing piece. Further, the fastener is made of a metal material, so that the upper end cover and the communicating piece can be electrically connected through the fastener. The fastener can be a screw, such as a tapping screw.

In an embodiment, the fixing piece further comprises a limiting portion arranged on a side of the fixing body away from the interior of the stator core and located in the sink groove; and the stator assembly further comprises a mating portion arranged on the communicating piece, corresponding to the limiting portion, and mated with the limiting portion.

In this embodiment, the fixing piece further comprises a limiting portion arranged on a side of the fixing body away from the interior of the stator core and located in the sink groove. The limiting portion is a snap portion. The stator assembly further comprises a mating portion arranged on the communicating piece, corresponding to the limiting portion, and when the communicating piece is embedded in the sink groove on the fixing body, the limiting portion is mated with the mating portion so as to reliably connect the communicating piece and the fixing piece. The mating portion is a snap mating portion.

In an embodiment, the mounting hole comprises a first mounting hole and a second mounting hole, the second mounting hole is arranged concentrically with the first mounting hole, the second mounting hole has a smaller diameter than the first mounting hole; and a portion of the communicating piece between the fixing piece and the upper end cover extends away from the upper end cover to form a recessed portion, the recessed portion is embedded in the first mounting hole, and the assembly hole is provided on the recessed portion.

In this embodiment, the mounting hole comprises a first mounting hole and a second mounting hole, the second mounting hole is arranged concentrically with the first mounting hole, and the second mounting hole has a smaller diameter than the first mounting hole. The first mounting hole is provided on the fixing body close to the upper end cover. A portion of the communicating piece between the fixing piece and the upper end cover extends away from the upper end cover and forms a recessed portion. The recessed portion is embedded in the first mounting hole. The recessed portion is in interference fit with the fixing body. Moreover, the assembly hole is provided on the recessed portion.

In an embodiment, a depth range of the first mounting hole is at least 1.5 mm and not more than 2.5 mm.

In this embodiment, the depth range of the first mounting hole is at least 1.5 mm and not more than 2.5 mm, i.e., the extension length range of the recessed portion is at least 1.5 mm and not more than 2.5 mm. When the above relationship is satisfied, a reliable connection between the communicating piece and the fixing body can be ensured.

In an embodiment, ends of the communicating piece are bent or curved away from the upper end cover, one end of the communicating piece is connected to the fixing piece, and the other end of the communicating piece is connected to the stator core.

In this embodiment, ends of the communicating piece are bent or curved away from the upper end cover, i.e., one end of the communicating piece is connected to the fixing piece, and the other end of the communicating piece is connected to the stator core. By bending or curving the two ends, the communicating piece is hook-shaped, thereby ensuring that the communicating piece is hooked on the fixing piece, and further ensuring a reliable connection between the communicating piece and the fixing piece. Further, the communicating piece is connected to the stator core by welding.

In an embodiment, the stator assembly further comprises an assembly groove, the assembly groove is arranged on an outer wall of the stator core, and at least part of the communicating piece is located in the assembly groove.

In this embodiment, the stator assembly further comprises an assembly groove, the assembly groove is arranged on an outer wall of the stator core, and at least part of the communicating piece is located in the assembly groove. The stator assembly further comprises a stator winding. When the stator winding is arranged on the stator core, the assembly groove is used for fixing the stator core, and the assembly groove cooperates with other tooling to realize the fixing of the stator core, so as to facilitate the arrangement of the stator winding, thereby enabling the assembly groove to be not only used for fixing the stator core in the assembly process, but also used for receiving the communicating piece, without the need to additionally provide a position for welding the communicating piece on the stator core; and also achieving fool-proofing and preventing the communicating piece from falling off due to external rubbing during movement or injection molding.

In an embodiment, the stator assembly further comprises a lower end cover and a conducting member, the lower end cover is arranged at a bottom of the stator core; and one end of the conducting member is connected to the lower end cover, and the other end of the conducting member is connected to the stator core.

In this embodiment, the stator assembly further comprises a lower end cover and a conducting member, the lower end cover is arranged at a bottom of the stator core; and one end of the conducting member is connected to the lower end cover, and the other end of the conducting member is connected to the stator core. That is, electrical conduction is realized between the lower end cover and the stator core through the conducting member, so as to avoid potential difference between the lower end cover and the stator core. Further, the upper end cover is electrically connected with the stator core through the communicating piece, the lower end cover is electrically connected with the stator core through the conducting member, and the stator core is used as a conducting medium to realize electrical connection between the upper end cover and the lower end cover, thereby effectively avoiding potential difference between the upper end cover and the lower end cover to prevent electric corrosion phenomenon of the electric motor and ensure the use safety performance of the electric motor.

In an embodiment, the stator assembly further comprises a housing and a mounting groove, the housing has a mounting cavity therein, the stator core, the insulation frame, the fixing piece and the communicating piece are located in the mounting cavity; the mounting groove is arranged on an outer wall of the housing, and part of the upper end cover is mounted in the mounting groove.

In this embodiment, the stator assembly further comprises a housing and a mounting groove, the housing has a mounting cavity therein, and the stator core, the insulation frame, the fixing piece and the communicating piece are located in the mounting cavity. The housing is made by an injection molding process. The mounting groove is arranged on the outer wall of the housing, and part of the upper end cover is embedded in the mounting groove, which, on the one hand, is able to facilitate the positioning and mounting of the upper end cover on the housing, and on the other hand, enables the upper end cover and the housing to form a whole with a flush outer wall, improving the appearance of the electric motor.

In an embodiment, the stator assembly further comprises a sealing ring sleeved on the housing and located in the mounting groove.

In this embodiment, the stator assembly further comprises a sealing ring sleeved on the housing and located in the mounting groove. When the upper end cover is mounted on the housing, the sealing ring is squeezed between the upper end cover and the housing. By providing the sealing ring, the sealing performance of the stator assembly can be effectively ensured, so that the interior of the stator assembly does not need to be coated with anti-rust oil, reducing the assembly procedures of the stator assembly. The sealing ring may be O-shaped.

In an embodiment, the stator assembly further comprises a wire outlet opening, a wire sealing member and a mounting plate, and the wire outlet opening is arranged on the upper end cover, avoiding the electric corrosion preventing hole; the wire sealing member covers the wire outlet opening, a wire opening of the wire sealing member communicates with the wire outlet opening; and the mounting plate is arranged on part of the wire sealing member to connect the wire sealing member with the upper end cover.

In this embodiment, the stator assembly further comprises a wire outlet opening, a wire sealing member and a mounting plate. The wire outlet opening is arranged on the upper end cover, avoiding the electric corrosion preventing hole. The wire outlet opening is used for leading out the wire inside the stator assembly, thereby facilitating connection of the wire to an external electric control. The wire sealing member covers the wire outlet opening, and a wire opening of the wire sealing member communicates with the wire outlet opening; then wire can be led out through the wire outlet opening and the wire opening. The mounting plate is arranged on part of the wire sealing member, so that the wire sealing member and the upper end cover are in sealing connection, which ensures the safe sealing performance of the interior of the stator assembly, and is able to reduce the production cost of the stator assembly.

In an embodiment, the wire sealing member comprises a sealing body and a glue nozzle, the sealing body is provided with a first wire opening, at least part of the sealing body is recessed towards the first wire opening to form an assembly recess, part of the mounting plate extends into the assembly recess; and the glue nozzle is connected to the sealing body and extends away from the upper end cover, and the glue nozzle communicates with the first wire opening.

In this embodiment, the wire sealing member comprises a sealing body and a glue nozzle, the sealing body is provided with a first wire opening, the first wire opening communicates with the wire outlet opening, at least part of the sealing body is recessed towards the interior of the first wire opening to form an assembly recess, and part of the mounting plate extends into the assembly recess to press part of the sealing body against the upper end cover. The glue nozzle is connected to the sealing body and extends away from the upper end cover, and the glue nozzle communicates with the first wire opening; then the wire inside the stator assembly extends out through the wire outlet opening, the first wire opening and the glue nozzle, and by means of the glue nozzle, the wire can be buffered, preventing the wire from being broken after the wire extends out.

The stator assembly further comprises a machine casing, the machine casing is arranged above the upper end cover, the machine casing and the upper end cover define a mounting area, and the external electric control is located in the mounting area. The upper end cover is further provided with screw holes, and the machine casing is mounted on the upper end cover through the screw holes.

According to the second aspect of the present disclosure, there is provided an electric motor, comprising the stator assembly provided by any of the above embodiments.

The electric motor provided by the present disclosure comprises the stator assembly of any of the above embodiments, and thus has all the beneficial effects of the stator assembly, which will not be repeated here.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of the embodiments in conjunction with the following drawings.

The corresponding relationship between the reference signs and component names in FIG. 1 to FIG. 11 is as follows:

1 upper end cover, 11 electric corrosion preventing hole, 12 fastener, 2 stator core, 21 assembly groove, 3 insulation frame, 4 fixing piece, 41 fixing body, 42 clamping groove, 43 limiting rib, 44 sink groove, 45 limiting portion, 46 mounting hole, 47 pin receiving portion, 48 mating portion, 49 end portion of the fastener, 5 communicating piece, 51 assembly hole, 52 recessed portion, 6 lower end cover, 7 conducting member, 8 housing, 81 sealing ring, 90 wire outlet opening, 91 sealing body, 92 glue nozzle, 93 mounting plate, 94 machine casing, 95 external electric control, and 100 stator assembly.

DETAILED DESCRIPTION OF THE DISCLOSURE

In order that the above-mentioned objectives, features and advantages of the present disclosure are able to be understood more clearly, a further detailed description of the present disclosure will be given below in connection with the accompanying drawings and specific embodiments. It should be noted that the embodiments of the present disclosure and the features in the embodiments are able to be combined with each other if there is no conflict.

In the following description, numerous specific details are set forth in order to provide a thorough understanding of the present disclosure. However, the present disclosure is able to also be implemented in other manners than those described herein. Therefore, the protection scope of the present disclosure is not limited to the specific embodiments disclosed below.

A stator assembly 100 and an electric motor according to some embodiments of the present disclosure are described below with reference to FIG. 1 to FIG. 11.

According to the first aspect of the present disclosure, there is provided a stator assembly 100, comprising an upper end cover 1, a stator core 2, an insulation frame 3, a fixing piece 4 and a communicating piece 5. The stator core 2 is located below the upper end cover 1. The insulation frame 3 is arranged on the stator core 2. The fixing piece 4 is arranged at a top of the insulation frame 3. One end of the communicating piece 5 is sandwiched between the fixing piece 4 and the upper end cover 1, and another end of the communicating piece 5 extends in a thickness direction of the upper end cover 1 and is connected to the stator core 2.

The stator core 2 is used for arranging a stator winding, and the upper end cover 1 is a cast aluminum end cover. The insulation frame 3 is arranged on the stator core 2, thereby preventing short circuit from occurring between the stator winding and the stator core 2 and further preventing the impact of the short circuit on the normal operation of the electric motor. The fixing piece 4 is arranged at a top of the insulation frame 3, and the fixing piece 4 may be a plastic fixing piece, i.e., the fixing piece 4 may play an insulating role. One end of the communicating piece 5 is sandwiched between the fixing piece 4 and the upper end cover 1, and another end of the communicating piece 5 extends in a thickness direction of the upper end cover 1 and is connected to the stator core 2. That is, electric conduction is realized between the upper end cover 1 and the stator core 2 through the communicating piece 5, which avoids potential difference between the upper end cover 1 and the stator core 2. According to the present disclosure, the fixing piece 4 fixes the insulation frame 3, the communicating piece 5 and the upper end cover 1. Thus, the internal structural composition of the stator assembly 100 is effectively optimized while ensuring the prevention of electric corrosion. As a result, the application scope of an electric corrosion prevention structure of the electric motor is expanded, the production cost of the electric motor is reduced, the assembly process is reduced, and the production efficiency is improved.

In one embodiment of the present disclosure, the fixing piece 4 comprises a fixing body 41 and a clamping groove 42, the clamping groove 42 is arranged at a bottom of the fixing body 41, and at least part of the insulation frame 3 is embedded in the clamping groove 42.

As shown in FIGS. 2-5, in this embodiment, the fixing piece 4 comprises a fixing body 41 and a clamping groove 42. The clamping groove 42 is arranged at a bottom of the fixing body 41, and at least part of the insulation frame 3 is embedded in the clamping groove 42. For example, the insulation frame 3 comprises a pin receiving portion 47 which is embedded in the clamping groove 42.

In one embodiment of the present disclosure, the fixing piece 4 further comprises limiting ribs 43 arranged on a side of the fixing body 41 facing the interior of the stator core 2.

Figure 4:
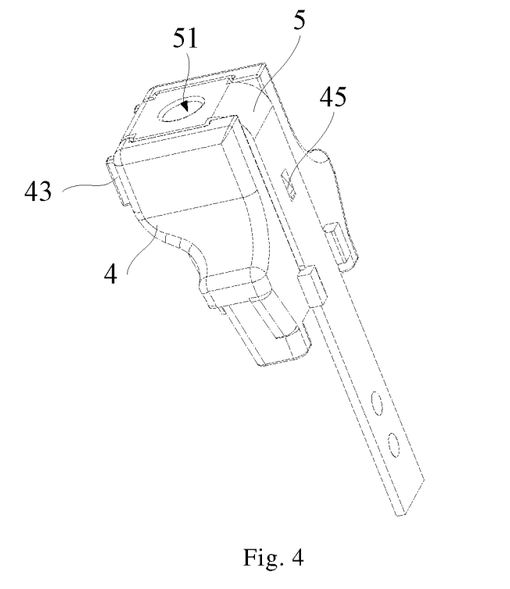
FIG. 4 is a partial structural view of a stator assembly according to another embodiment of the present disclosure.
Figure 5:
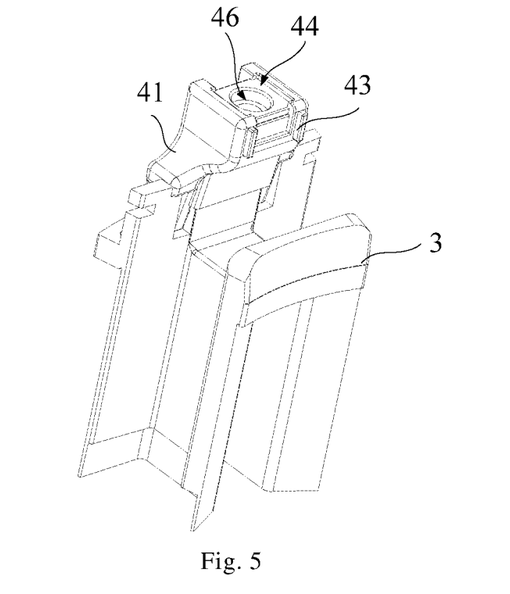
FIG. 5 is a partial structural view of a stator assembly according to a further embodiment of the present disclosure.

As shown in FIGS. 4 and 5, in this embodiment, the fixing piece 4 further comprises limiting ribs 43 arranged on a side of the fixing body 41 facing the interior of the stator core 2. During the process of injection molding of the fixing piece 4, the insulation frame 3, the stator core 2 and the upper end cover 1, due to the effect of the injection molding pressure, the fixing piece 4 will receive a force towards the interior of the stator core 2, and by arranging limiting ribs 43, the limiting ribs 43 are able to abut against the injection mold during the injection molding process, thereby preventing the fixing piece 4 from falling towards the interior of the stator core 2, and ensuring the position accuracy of the fixing piece 4. Further, the number of limiting ribs 43 is at least two.

In one embodiment of the present disclosure, the fixing piece 4 further comprises a sink groove 44, which is arranged on the fixing body 41 and in which at least part of the communicating piece 5 is embedded.

As shown in FIG. 5, in this embodiment, the fixing piece 4 further comprises a sink groove 44, the sink groove 44 is arranged on the fixing body 41, and at least part of the communicating piece 5 is embedded in the sink groove 44, thereby ensuring that the communicating piece 5 is not easily displaced in both the radial direction and the axial direction, and ensuring the position stability of the communicating piece 5 on the fixing piece 4.

In one embodiment of the present disclosure, the fixing piece 4 further comprises a threaded mounting hole 46 arranged at a top of the fixing body 41 and located in the sink groove 44; and the stator assembly 100 further comprises an assembly hole 51 and an electric corrosion preventing hole 11. The assembly hole 51 is arranged at a top of the communicating piece 5, corresponding to the mounting hole 46. The electric corrosion preventing hole 11 is provided on the upper end cover 1, corresponding to the assembly hole 51. An end portion 49 of fastener 12 is passed through the electric corrosion preventing hole 11, the assembly hole 51 and the mounting hole 46 to connect the upper end cover 1, the communicating piece 5 and the fixing piece 4.

Figure 3:
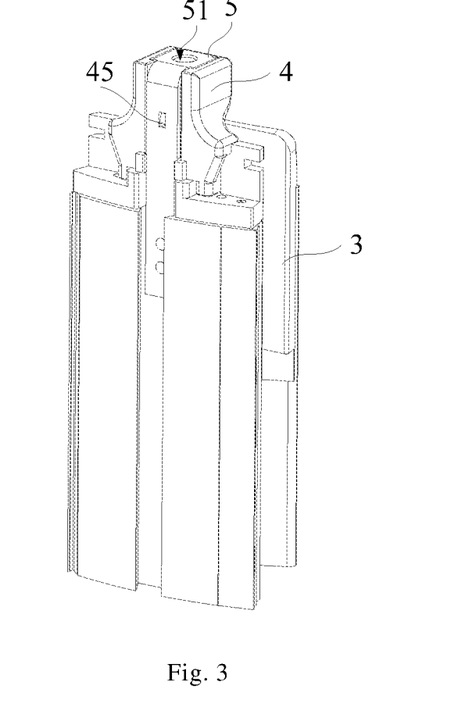
FIG. 3 is a partial structural view of a stator assembly according to one embodiment of the present disclosure.

As shown in FIGS. 3-5, in this embodiment, the fixing piece 4 further comprises a mounting hole 46 arranged at a top of the fixing body 41 and located in the sink groove 44. The mounting hole 46 may be a blind hole. The stator assembly 100 further comprises an assembly hole 51 and an electric corrosion preventing hole 11. The assembly hole 51 is arranged at a top of the communicating piece 5, corresponding to the mounting hole 46. The electric corrosion preventing hole 11 is provided on the upper end cover 1, corresponding to the assembly hole 51. A fastener 12 is passed through the electric corrosion preventing hole 11, the assembly hole 51 and the mounting hole 46 to connect the upper end cover 1, the communicating piece 5 and the fixing piece 4. Further, the fastener 12 is made of a metal material, so that the upper end cover 1 and the communicating piece 5 can be electrically connected through the fastener 12. The fastener 12 can be a screw, such as a tapping screw.

Figure 2:
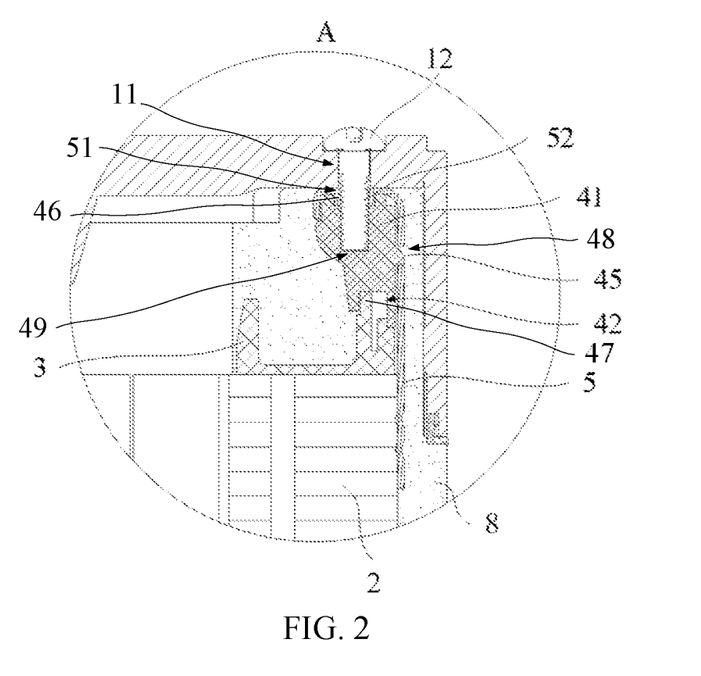
FIG. 2 is a partially enlarged view at A of the stator assembly according to one embodiment of the present disclosure as shown in FIG. 1.

In one embodiment of the present disclosure, the fixing piece 4 further comprises a limiting portion 45 arranged on a side of the fixing body 41 away from the interior of the stator core 2 and located in the sink groove 44; and the stator assembly 100 further comprises a mating portion 48 arranged on the communicating piece 5, corresponding to the limiting portion 45, and mated with the limiting portion 45. Stated somewhat differently, and as illustrated in FIG. 2 and described above, fastener 12 may be inserted through electric corrosion preventing hole 11 and through assembly hole 51 to reach threaded mounting hole 46 at the top of communicating piece 5. As fastener 12 (e.g., as a screw) is advanced through a top portion of communicating piece 5 and into fixing body 41, the threaded portion of mounting hole 46 may connect upper end cover 1 to communicating piece 5 while an end portion 49 of fastener 12 may advance into fixing body 41 at a depth range of at least 1.5 mm and not more than 2.5 mm. As illustrated, when end portion 49 of fastener 12 contacts fixing body 41 at a sufficient depth (e.g., at the end of the depth range), at least a portion of plastic fixing body 41 may move about limiting portion 45 and mating portion 48 to embed (e.g., clamp) pin receiving portion 47 at least partially within clamping groove 42.

As shown in FIGS. 2-4, in this embodiment, the fixing piece 4 further comprises a limiting portion 45 arranged on a side of the fixing body 41 away from the interior of the stator core 2 and located in the sink groove 44. For example, the limiting portion 45 is a snap portion. The stator assembly 100 further comprises a mating portion arranged on the communicating piece 5, corresponding to the limiting portion 45, and when the communicating piece 5 is embedded in the sink groove 44 on the fixing body 41, the limiting portion 45 is mated with the mating portion so as to reliably connect the communicating piece 5 and the fixing piece 4. For example, the mating portion is a snap mating portion.

In one embodiment of the present disclosure, the mounting hole 46 comprises a first mounting hole and a second mounting hole, the second mounting hole is arranged concentrically with the first mounting hole, the second mounting hole has a smaller diameter than the first mounting hole; and a portion of the communicating piece 5 between the fixing piece 4 and the upper end cover 1 extends away from the upper end cover 1 to form a recessed portion 52, the recessed portion 52 is embedded in the first mounting hole, and the assembly hole 51 is provided on the recessed portion 52.

In this embodiment, the mounting hole 46 comprises a first mounting hole and a second mounting hole, the second mounting hole is arranged concentrically with the first mounting hole, and the second mounting hole has a smaller diameter than the first mounting hole. The first mounting hole is provided on the fixing body 41 close to the upper end cover 1. A portion of the communicating piece 5 between the fixing piece 4 and the upper end cover 1 extends away from the upper end cover 1 and forms a recessed portion 52. The recessed portion 52 is embedded in the first mounting hole, and further, the recessed portion 52 is in interference fit with the fixing body 41. Moreover, the assembly hole 51 is provided on the recessed portion 52.

In one embodiment of the present disclosure, a depth range of the first mounting hole is at least 1.5 mm and not more than 2.5 mm.

In this embodiment, the depth range of the first mounting hole is at least 1.5 mm and not more than 2.5 mm, i.e., the extension length range of the recessed portion 52 is at least 1.5 mm and not more than 2.5 mm. When the above relationship is satisfied, a reliable connection between the communicating piece 5 and the fixing body 41 can be ensured.

In one embodiment of the present disclosure, ends of the communicating piece 5 are bent or curved away from the upper end cover 1, one end of the communicating piece 5 is connected to the fixing piece 4, and the other end of the communicating piece 5 is connected to the stator core 2.

As shown in FIGS. 2-4, in this embodiment, ends of the communicating piece 5 are bent or curved away from the upper end cover 1, i.e., one end of the communicating piece 5 is connected to the fixing piece 4, and the other end of the communicating piece 5 is connected to the stator core 2. By bending or curving the two ends, the communicating piece 5 is hook-shaped, thereby ensuring that the communicating piece 5 is hooked on the fixing piece 4, and further ensuring a reliable connection between the communicating piece 5 and the fixing piece 4. Further, the communicating piece 5 is connected to the stator core 2 by welding.

In one embodiment of the present disclosure, the stator assembly 100 further comprises an assembly groove 21, the assembly groove 21 is arranged on an outer wall of the stator core 2, and at least part of the communicating piece 5 is located in the assembly groove 21.

Figure 6:
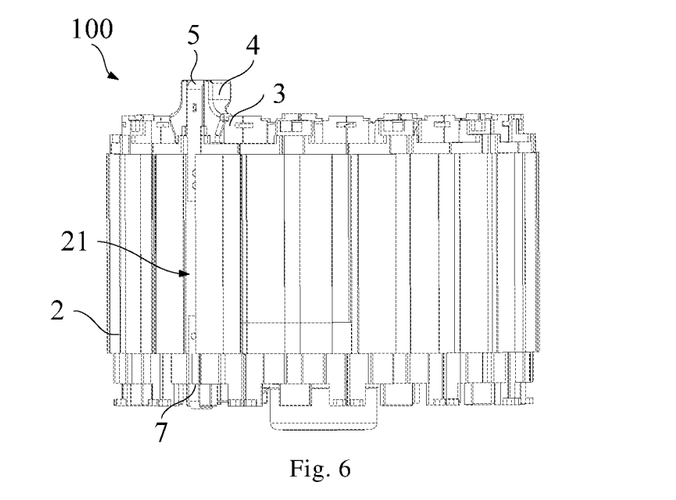
FIG. 6 is a partial structural view of a stator assembly according to a further embodiment of the present disclosure.
Figure 7:
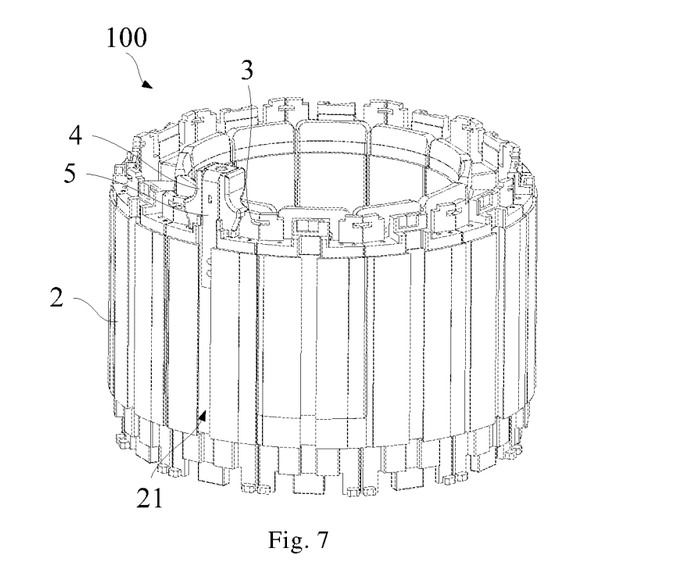
FIG. 7 is a partial structural view of a stator assembly according to a further embodiment of the present disclosure.

As shown in FIGS. 6 and 7, in this embodiment, the stator assembly 100 further comprises an assembly groove 21, the assembly groove 21 is arranged on an outer wall of the stator core 2, and at least part of the communicating piece 5 is located in the assembly groove 21. The stator assembly 100 further comprises a stator winding. When the stator winding is arranged on the stator core 2, the assembly groove 21 is used for fixing the stator core 2, and the assembly groove 21 cooperates with other tooling to realize the fixing of the stator core 2, so as to facilitate the arrangement of the stator winding, thereby enabling the assembly groove 21 to be not only used for fixing the stator core 2 in the assembly process, but also used for receiving the communicating piece 5, without the need to additionally provide a position for welding the communicating piece 5 on the stator core 2; and also achieving fool-proofing and preventing the communicating piece 5 from falling off due to external rubbing during movement or injection molding.

In one embodiment of the present disclosure, the stator assembly 100 further comprises a lower end cover 6 and a conducting member 7, the lower end cover 6 is arranged at a bottom of the stator core 2; and one end of the conducting member 7 is connected to the lower end cover 6, and the other end of the conducting member 7 is connected to the stator core 2.

Figure 1:
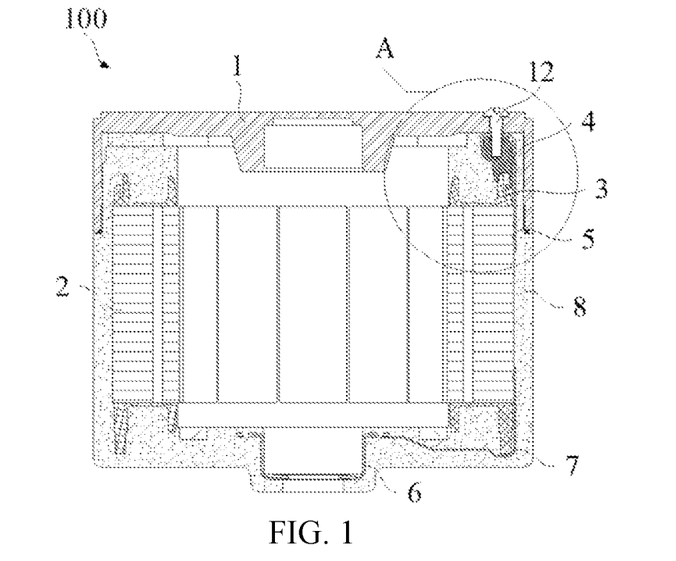
FIG. 1 is a sectional structural view of a stator assembly according to one embodiment of the present disclosure.

As shown in FIGS. 1, 6 and 7, in this embodiment, the stator assembly 100 further comprises a lower end cover 6 and a conducting member 7, the lower end cover 6 is arranged at a bottom of the stator core 2; and one end of the conducting member 7 is connected to the lower end cover 6, and the other end of the conducting member 7 is connected to the stator core 2. That is, electrical conduction is realized between the lower end cover 6 and the stator core 2 through the conducting member 7, so as to avoid potential difference between the lower end cover 6 and the stator core 2. Further, the upper end cover 1 is electrically connected with the stator core 2 through the communicating piece 5, the lower end cover 6 is electrically connected with the stator core 2 through the conducting member 7, and the stator core 2 is used as a conducting medium to realize electrical connection between the upper end cover 1 and the lower end cover 6, thereby effectively avoiding potential difference between the upper end cover 1 and the lower end cover 6 to prevent electric corrosion phenomenon of the electric motor and ensuring the use safety performance of the electric motor.

In one embodiment of the present disclosure, the stator assembly 100 further comprises a housing 8 and a mounting groove, the housing 8 has a mounting cavity therein, the stator core 2, the insulation frame 3, the fixing piece 4 and the communicating piece 5 are located in the mounting cavity; the mounting groove is arranged on an outer wall of the housing 8, and part of the upper end cover 1 is mounted in the mounting groove.

As shown in FIG. 1, in this embodiment, the stator assembly 100 further comprises a housing 8 and a mounting groove, the housing 8 has a mounting cavity therein, and the stator core 2, the insulation frame 3, the fixing piece 4 and the communicating piece 5 are located in the mounting cavity. The housing 8 is made by an injection molding process. The mounting groove is arranged on the outer wall of the housing 8, and part of the upper end cover 1 is embedded in the mounting groove, which, on the one hand, is able to facilitate the positioning and mounting of the upper end cover 1 on the housing 8, and on the other hand, enables the upper end cover 1 and the housing 8 to form a whole with a flush outer wall, improving the appearance of the electric motor.

In one embodiment of the present disclosure, the stator assembly 100 further comprises a sealing ring 81 sleeved on the housing 8 and located in the mounting groove.

As shown in FIGS. 8-11, in this embodiment, the stator assembly 100 further comprises a sealing ring 81 sleeved on the housing 8 and located in the mounting groove. When the upper end cover 1 is mounted on the housing 8, the sealing ring 81 is squeezed between the upper end cover 1 and the housing 8. By providing the sealing ring 81, the sealing performance of the stator assembly 100 can be effectively ensured, so that the interior of the stator assembly 100 does not need to be coated with anti-rust oil, reducing the assembly procedures of the stator assembly 100. The sealing ring 81 may be O-shaped.

In one embodiment of the present disclosure, the stator assembly 100 further comprises a wire outlet opening 90, a wire sealing member and a mounting plate 93, and the wire outlet opening 90 is arranged on the upper end cover 1, avoiding the electric corrosion preventing hole 11. The wire sealing member covers the wire outlet opening 90, and a wire opening of the wire sealing member communicates with the wire outlet opening 90. The mounting plate 93 is arranged on part of the wire sealing member to connect the wire sealing member with the upper end cover 1.

Figure 8:
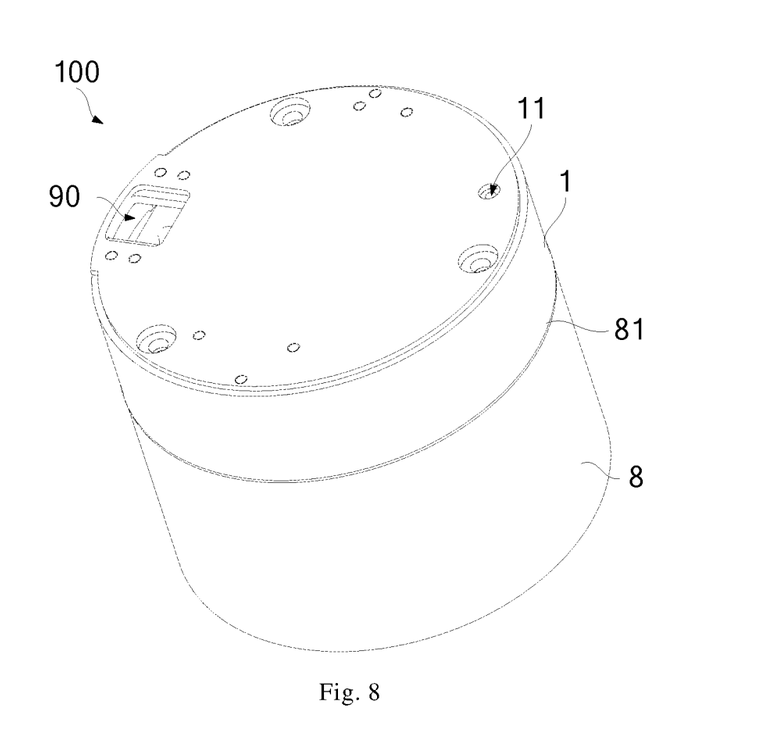
FIG. 8 is a partial structural view of a stator assembly according to a further embodiment of the present disclosure.

As shown in FIG. 8, in this embodiment, the stator assembly 100 further comprises a wire outlet opening 90, a wire sealing member and a mounting plate 93. The wire outlet opening 90 is arranged on the upper end cover 1, avoiding the electric corrosion preventing hole 11. The wire outlet opening 90 is used for leading out the wire inside the stator assembly 100, thereby facilitating connection of the wire to an external electric control 95. The wire sealing member covers the wire outlet opening 90, and a wire opening of the wire sealing member communicates with the wire outlet opening 90; then wire can be led out through the wire outlet opening 90 and the wire opening. The mounting plate 93 is arranged on part of the wire sealing member, so that the wire sealing member and the upper end cover 1 are in sealing connection, which ensures the safe sealing performance of the interior of the stator assembly 100, and is able to reduce the production cost of the stator assembly 100.

In one embodiment of the present disclosure, the wire sealing member comprises a sealing body 91 and a glue nozzle 92, the sealing body 91 is provided with a first wire opening, at least part of the sealing body 91 is recessed towards the first wire opening to form an assembly recess, and part of the mounting plate 93 extends into the assembly recess. The glue nozzle 92 is connected to the sealing body 91 and extends away from the upper end cover 1, and the glue nozzle 92 communicates with the first wire opening.

Figure 9:
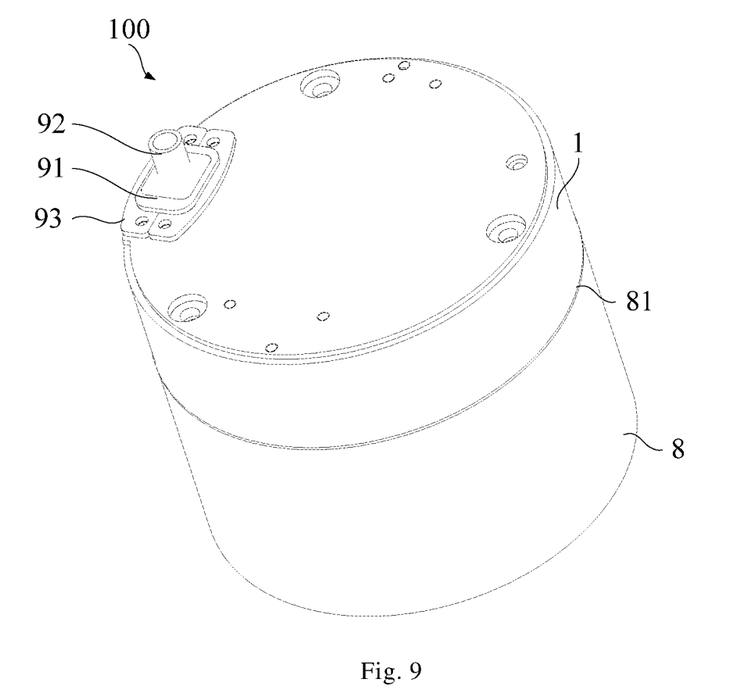
FIG. 9 is a partial structural view of a stator assembly according to a further embodiment of the present disclosure.
Figure 10:
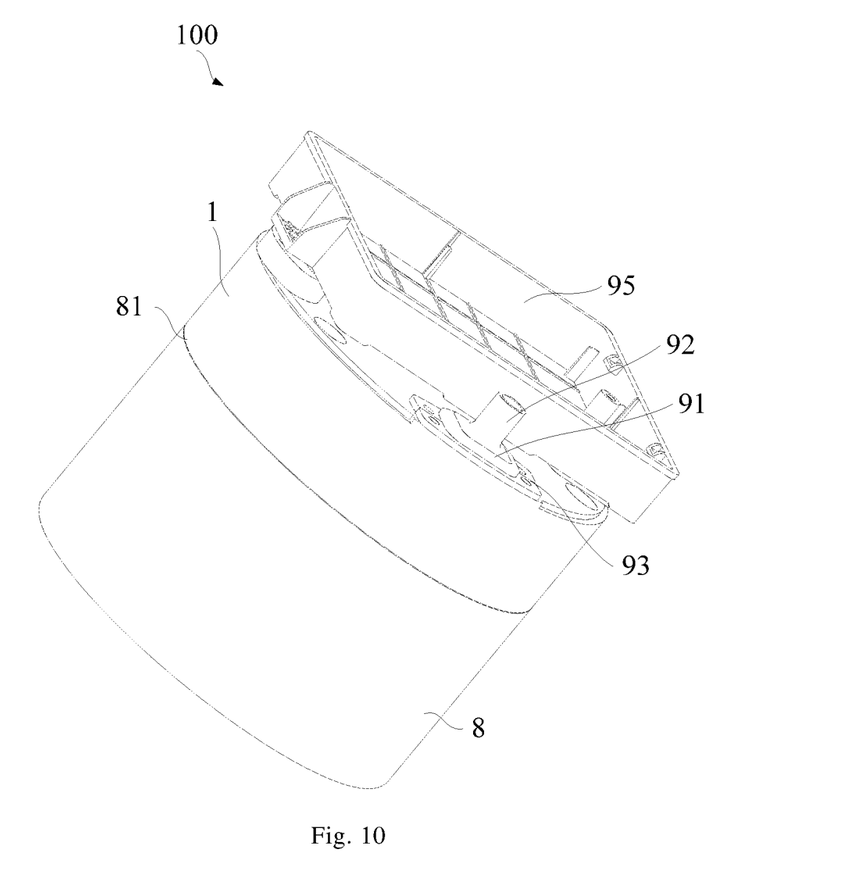
FIG. 10 is a partial structural view of a stator assembly according to a further embodiment of the present disclosure.

As shown in FIGS. 9 and 10, in this embodiment, the wire sealing member comprises a sealing body 91 and a glue nozzle 92, the sealing body 91 is provided with a first wire opening, the first wire opening communicates with the wire outlet opening 90, at least part of the sealing body 91 is recessed towards the interior of the first wire opening to form an assembly recess, and part of the mounting plate 93 extends into the assembly recess to press part of the sealing body 91 against the upper end cover 1. The glue nozzle 92 is connected to the sealing body 91 and extends away from the upper end cover 1, and the glue nozzle 92 communicates with the first wire opening; then the wire inside the stator assembly 100 extends out through the wire outlet opening 90, the first wire opening and the glue nozzle 92, and by means of the glue nozzle 92, the wire can be buffered, preventing the wire from being broken after the wire extends out.

Figure 11:
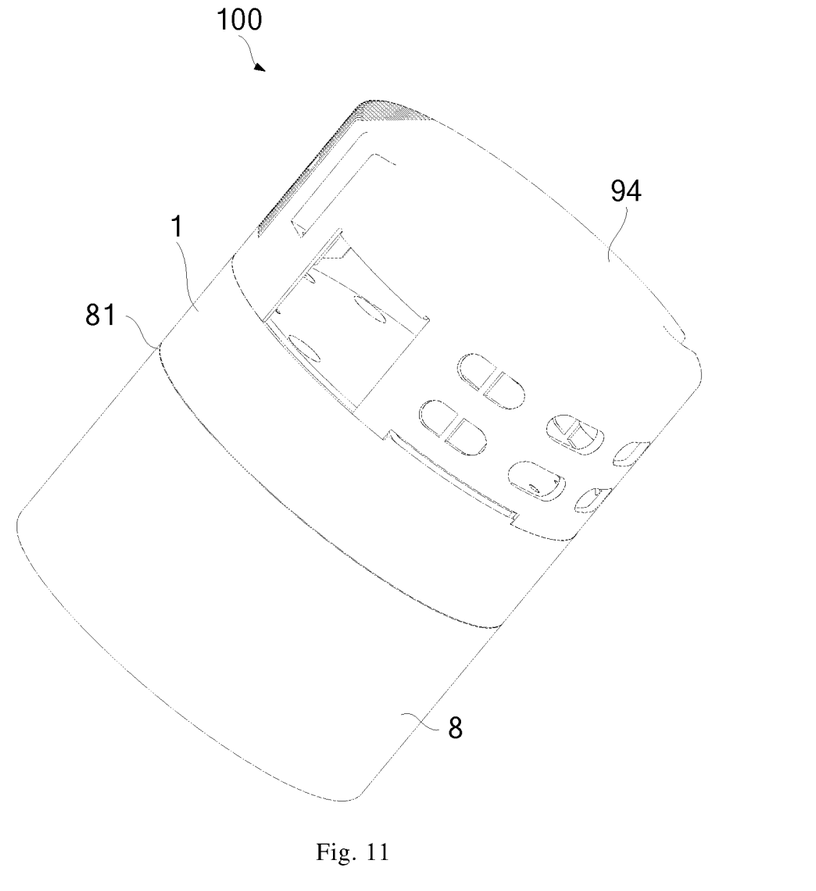
FIG. 11 is a partial structural view of a stator assembly according to a further embodiment of the present disclosure.

As shown in FIG. 11, the stator assembly 100 further comprises a machine casing 94, the machine casing 94 is arranged above the upper end cover 1, the machine casing 94 and the upper end cover 1 define a mounting area, and the external electric control 95 is located in the mounting area. The upper end cover 1 is further provided with screw holes, and the machine casing 94 is mounted on the upper end cover 1 through the screw holes.

According to the second aspect of the present disclosure, there is provided an electric motor, comprising the stator assembly 100 provided by any of the above embodiments.

The electric motor provided by the present disclosure comprises the stator assembly 100 of any of the above embodiments, and thus has all the beneficial effects of the stator assembly 100, which will not be repeated here.

In the present disclosure, the term "plurality" means two or more, unless otherwise expressly defined. The terms "installing", "connected", "connection", "fixing" and the like should be understood in a broad sense. For example, "connection" may be a fixed connection, a removable connection or an integral connection; and "connected" may refer to direct connection or indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A stator assembly comprising:
   an upper end cover;
   a stator core located below the upper end cover;
   an insulation frame arranged on the stator core;
   a fixing piece arranged at a top of the insulation frame; and
   a communicating piece, having one end sandwiched between the fixing piece and the upper end cover, and another end extending in a thickness direction of the upper end cover and connected to the stator core,
   wherein the fixing piece comprises:
      a fixing body; and
      a clamping groove, which is arranged at a bottom of the fixing body, and in which at least part of the insulation frame is embedded.

2. The stator assembly according to claim 1, wherein the fixing piece further comprises:
   limiting ribs, arranged on a side of the fixing body facing an interior of the stator core.

3. The stator assembly according to claim 1, wherein the fixing piece further comprises:
   a sink groove, arranged on the fixing body and in which at least part of the communicating piece is embedded.

4. The stator assembly according to claim 3, wherein:
   the fixing piece further comprises a mounting hole arranged at a top of the fixing body and located in the sink groove; and
   the stator assembly further comprises:
   an assembly hole, arranged at a top of the communicating piece, corresponding to the mounting hole; and
   an electric corrosion preventing hole, arranged on the upper end cover, corresponding to the assembly hole, a fastener being passed through the electric corrosion preventing hole, the assembly hole and the mounting hole to connect the upper end cover, the communicating piece and the fixing piece.

5. The stator assembly according to claim 4, wherein:
   the fixing piece further comprises a limiting portion, arranged on a side of the fixing body away from the interior of the stator core and located in the sink groove; and
   the stator assembly further comprises a mating portion, arranged on the communicating piece, corresponding to the limiting portion, and mated with the limiting portion.

6. The stator assembly according to claim 4, wherein:
   the mounting hole comprises:
      a first mounting hole; and
      a second mounting hole, arranged concentrically with the first mounting hole and having a smaller diameter than the first mounting hole, and
   a portion of the communicating piece between the fixing piece and the upper end cover extends away from the upper end cover to form a recessed portion, the recessed portion is embedded in the first mounting hole, and the assembly hole is provided on the recessed portion.

7. The stator assembly according to claim 6, wherein a depth range of the first mounting hole is at least 1.5 mm and not more than 2.5 mm.

8. The stator assembly according to claim 1, wherein:
   ends of the communicating piece are bent or curved away from the upper end cover, one end of the communicating piece is connected to the fixing piece, and another end of the communicating piece is connected to the stator core.

9. The stator assembly according to claim 1, wherein the stator assembly further comprises:
   an assembly groove, arranged on an outer wall of the stator core, and in which at least part of the communicating piece is located.

10. The stator assembly according to claim 9, wherein the stator assembly further comprises:
    a lower end cover, arranged at a bottom of the stator core; and
    a conducting member, having one end connected to the lower end cover, and another end connected to the stator core.

11. The stator assembly according to claim 1, wherein the stator assembly further comprises:
    a housing, having a mounting cavity therein, the stator core, the insulation frame, the fixing piece and the communicating piece being located in the mounting cavity; and
    a mounting groove, arranged on an outer wall of the housing, and in which part of the upper end cover is mounted.

12. The stator assembly according to claim 11, wherein the stator assembly further comprises:
    a sealing ring, sleeved on the housing and located in the mounting groove.

13. The stator assembly according to claim 1, wherein the stator assembly further comprises:
    a wire outlet opening, arranged on the upper end cover, avoiding the electric corrosion preventing hole;
    a wire sealing member, covering the wire outlet opening, and a wire opening of the wire sealing member communicating with the wire outlet opening; and
    a mounting plate, arranged on part of the wire sealing member to connect the wire sealing member with the upper end cover.

14. The stator assembly according to claim 13, wherein the wire sealing member comprises:
    a sealing body, provided with a first wire opening, at least part of the sealing body being recessed towards the first wire opening to form an assembly recess into which part of the mounting plate extends; and
    a glue nozzle, connected to the sealing body and extending away from the upper end cover, the glue nozzle communicating with the first wire opening.

15. An electric motor comprising the stator assembly according to claim 1.

16. The stator assembly of claim 1, wherein the insulation frame comprises a pin receiving portion which is embedded in the clamping groove.

17. The stator assembly of claim 4,
    wherein the mounting hole is threaded, and
    wherein the fastener is a screw.

18. The stator assembly of claim 17,
    wherein the fixing body includes a plastic, and
    wherein an end portion of the fastener being advanced through fixing body at a sufficient depth to move at least a portion of fixing body around a limiting portion to embed pin receiving portion at least partially within the clamping groove.

* * * * *